United States Patent Office 3,303,205
Patented Feb. 7, 1967

3,303,205
PROCESS FOR INTRODUCTION OF A HYDROXY-
ALKYL SUBSTITUENT AT THE 17 POSITION IN
STEROID COMPOUNDS
Seemon H. Pines, Murray Hill, N.J., assignor to Merck
& Co., Inc., Rahway, N.J., a corporation of New
Jersey
No Drawing. Filed Apr. 1, 1965, Ser. No. 444,799
13 Claims. (Cl. 260—397.5)

This invention relates to a process for the direct introduction of a hydroxyalkyl side-chain at the 17-position of a steroid or at the 17a-position of a D-homo-steroid to provide a 17β-hydroxy-17α-hydroxyalkyl steroid or a 17aβ-hydroxy-17aα-hydroxyalkyl - D - homo steroid. More particularly, this invention relates to the direct introduction of a hydroxyalkyl side-chain at the 17-position of a steroid or at the 17a-position of a D-homo steroid by reacting a 17-oxo steroid or a 17a-oxo-D-homo steroid with the reaction product of lithium metal and a haloalkoxysilane, an omega-lithium - alkoxy - silyl compound, in the presence of a solvent suitable for use in a Grignard reaction to provide a 17β-hydroxy-17α-alkoxy-steroidal silane or a 17aβ-hydroxy-17aα-alkoxy - D - homo-steroidal silane and subjecting the 17β - hydroxy - 17α-alkoxysteroidal silane or the 17aβ-hydroxy-17aα-alkoxy-D-homosteroidal silane to hydrolyzing conditions to provide a 17β-hydroxy-17α-hydroxyalkyl steroid or a 17aβ-hydroxy-17aα-hydroxyalkyl-D-homo steroid.

The haloalkoxysilanes which may be used in the practice of this invention have the following structural formula:

$$[X-R_1-O]_n Si(R_2)_x$$

wherein X is halogen, more particularly, chlorine or bromine and preferably chlorine, $R_1$ is an alkylene radical which may be branch-chained but which has at least three linearly disposed carbon atoms, $n$ is a number not greater than two, $R_2$ is an alkyl, aralkyl, aryl or cycloalkyl radical, preferably methyl or ethyl, the $R_2$ radicals in a molecule being different or the same, $x$ being a number not less than two and not greater than three, and $x$ being 2 if $n$ is 2 and 3 if $n$ is one.

The haloalkoxysilanes react with lithium to form omega-lithium-alkoxysilyl compounds, which have the following structural formula:

$$[Li-R_1-O-]_n Si(R_2)_x$$

in which $R_1$, $R_2$, $n$ and $x$ have the same significance as above.

The 17β-hydroxy - 17α - alkoxysteroidal silanes or the 17aβ-hydroxy-17aα-alkoxy-D-homosteroidal silanes produced by the process of this invention, have the following structural formula, in which only the D-ring of the steroid part of the molecule is shown:

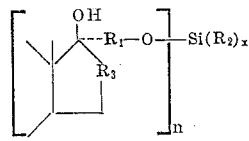

wherein R, $n$, $x$, and $R_2$ have the same significance as above and $R_3$ is methylene or ethylene. If $n$ is one and $x$ is three in the haloalkoxysilane used in the reaction with a 17-oxo steroid or a 17a-oxo-D-homo steroid, a 17β-hydroxy-17α-alkoxysteroidal silane or a 17aβ-hydroxy-17aα-alkoxy-D-homo-steroidal silane is produced. If $n$ is two and $x$ is two in the haloalkoxysilane used in the reaction with a 17-oxo steroid or a 17a-oxo-D-homo steroid, a bis-(17β-hydroxy-17α-alkoxysteroidal) silane or a bis-(17aβ-hydroxy-17aα-alkoxy - D - homosteroidal) silane is produced. Any of these is readily converted to a 17β-hydroxy-17α-hydroxyalkyl steroid or to a 17aβ-hydroxy-17aα-hydroxyalkyl-D-homo steroid when subjected to hydrolyzing conditions.

The steroid ring may be substituted with non-reactive groups and may also be substituted with a hydroxyl group; however, if an unprotected hydroxyl group is present on a carbon atom of the ring system, an additional equivalent of haloalkoxysilane is used in the reaction. An oxo-group on a carbon atom of the ring system other than on the 17- or 17a-carbon atom reacts with haloalkoxysilane in the same manner as an oxo-group on the 17- or 17a-carbon atom reacts.

The D-ring of the 17β-hydroxy - 17α - hydroxyalkyl steroids and 17aβ-hydroxy-17aα-hydroxalkyl - D - homo steroids produced by the process of this invention, has the following structural formula:

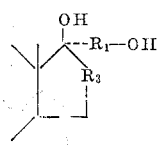

wherein $R_1$ and $R_3$ have the same significance as above.

In carrying out the process of this invention, two molar equivalents of finely divided lithium metal are added rapidly to a stirred solution of the haloalkoxysilane in a solvent suitable for use in a Grignard reaction, more particularly, in a solvent such as ether, dioxane, tetrahydrofuran, or ethyleneglycol dimethylether. The reaction is conducted at room temperature and stirring is continued for about 15 to 20 minutes at which time substantially all of the lithium is in solution. A solution of not more than, but preferably less than, one molar equivalent of the 17-oxo-steroid or 17a-oxo-D-homo steroid in solution in a solvent suitable for use in a Grignard reaction is then added to the solution containing the omega-lithium-alkoxysilyl compound formed by the reaction between the haloalkoxysilane and lithium. This reaction mixture is stirred at room temperature for about one hour. About two molar equivalents of a lower aliphatic alcohol are then added to react with any unreacted lithium and the temperature of the reaction mixture is brought to about 0° C. A hydrolyzing agent, such as water, acetic acid, hydrochloric acid, or sulfuric acid is slowly added while the reaction mixture is stirred and the resulting mixture is stirred and allowed to stand at about 0° C. for several hours. The precipitate is removed by filtration and the 17β-hydroxy-17α-hydroxyalkyl steroid or 17aβ-hydroxy-17aα-hydroxyalkyl-D-homo steroid is separated from unreacted starting material by any suitable means, such as differential solvent extraction, more particularly, extraction with ether or chloroform, to remove unreacted starting material or by chromatographic means.

The 17β-hydroxy-17α-hydroxyalkyl steroids and the 17aβ-hydroxy-17aα-hydroxyalkyl-D - homo - steroids prepared according to the process of this invention have utility as intermediates in the production of compounds such as a 19-nor-20-spirox-4-ene-3-one which has the following structural formula:

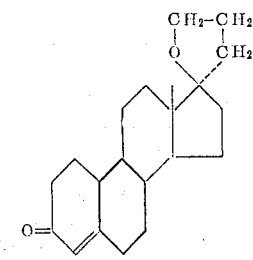

19-nor-spirox-4-ene-3-one has the ability to block the salt-retaining effects of aldosterone and other salt-retaining steroids so as to be useful in the treatment of diseases such as congestive heart failure and nephrosis and cirrhosis of the kidney in which aldosterone secretion is increased.

In making the 19-nor-20-spirox-4-ene-3-one, 3-methoxy-17α-(3'-hydroxypropyl)-estra-1,3,5(10)-triene - 17β - ol, which is prepared according to the process of this invention by introducing a hydroxypropyl side chain into the 17-position of 3-methoxyestra-1,3,5(10)-triene-17-one, may be used as a starting material.

The 3-methoxy-17α-(3-hydroxypropyl)-estra-1,3,5(10)-triene-17β-ol is reacted with an organic sulfonyl halide, such as methanesulfonyl chloride, benzenesulfonyl chloride or p-toluenesulfonyl chloride in the presence of an organic base, such as pyridine, at room temperature to give 3-methoxy-19-nor-20-spirox-1,3,5(10)-triene, which has the following structure:

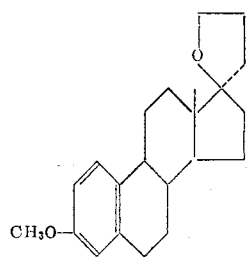

Upon adding lithium to a mixture of 3-methoxy-19-nor-20-spirox-1,3,5(10)-triene in anhydrous ammonia and an anhydrous solvent such as tetrahydrofuran, there is formed 3-methoxy-19-nor-20-spirox-2,5(10)-diene which may be represented by the following formula:

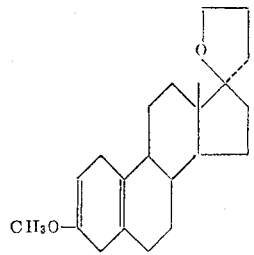

The 3-methoxy-19-nor-20-spirox-2,5(10)-diene is then treated with an acidic reagent, for example, aqueous oxalic acid, in order to obtain 19-nor-20-spirox-5(10)-ene-3-one which has the following structure:

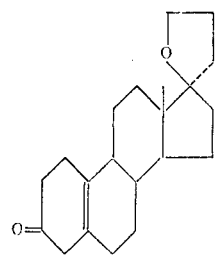

Treatment of 19-nor-20-spirox-5(10)-ene-3-one with a metal alkoxide, such as sodium methylate, in a lower alkanol, for example methanol, gives 19-nor-20-spirox-4-ene-3-one.

The following examples illustrate methods of carrying out the invention, but it is to be understood that these examples are given for purposes of illustration and not of limitation.

EXAMPLE 1

*Preparation of 3-methoxy-17α-(3'-hydroxypropyl)-estra-1,3,5(10)-triene-17β-ol*

234 mg. of finely divided lithium are added to a stirred solution of 2.36 g. of gamma-chloropropoxytrimethylsilane in solution of 3 ml. of tetrahydrofuran. After the lithium is added, the reaction mixture is stirred for twenty minutes at room temperature. A solution of 1.42 g. of 3-methoxy-estra-1,3,5(10)-triene-17-one in 5 ml. of tetrahydrofuran is then added to the reaction mixture with stirring. The reaction mixture is allowed to stand with stirring at room temperature for one hour. 5 ml. of ethanol are then added and the reaction mixture is stirred for twenty minutes at room temperature. The temperature of the reaction mixture is brought to 0° C. and 10 ml. of 2.5 N hydrochloric acid are added with stirring to the reaction mixture. The reaction mixture is allowed to stand at 0° C. for two hours and then filtered to remove the precipitate of unreacted starting material and 3-methoxy - 17α-(3'-hydroxypropyl)-estra-1,3,5(10)-triene-17β - ol. 3 - methoxy - 17α-(3'-hydroxypropyl)-estra-1,3,5(10)-triene-17β-ol is obtained in pure form by chromatographing the precipitate on neutral alumina.

EXAMPLE 2

*Preparation of 3-methoxy-17aα-(hydroxypropyl)-17aβ-hydroxy-1,3,5(10)-D-homoestratriene*

234 mg. of finely divided lithium are added to a stirred solution of 2.36 g. of gamma-chloropropoxytrimethylsilane in solution of 3 ml. of tetrahydrofuran. After the lithium is added, the reaction mixture is stirred for twenty minutes at room temperature. A solution of 1.48 g. of 3-methoxy-1,3,5(10)-D-homoestratriene-17-one in 5 ml. of tetrahydrofuran is then added to the reaction mixture with stirring. The reaction mixture is allowed to stand with stirring at room temperature for one hour. 5 ml. of ethanol are then added and the reaction mixture is brought to 0° C. and 10 ml. of 2.5 N hydrochloric acid are added with stirring to the reaction mixture. The reaction mixture is allowed to stand at 0° C. for two hours and then filtered to remove the precipitate of unreacted starting material and 3-methoxy-17aα-(3'-hydroxypropyl) - 17aβ-hydroxy-1,3,5(10)-D-homoestratriene. The 3 - methoxy-17aα-(3'-hydroxypropyl)-17aβ-hydroxy-1,3,5(10)-(D)-homoestratriene is obtained in pure form by chromatographing the precipitate on neutral alumina.

EXAMPLE 3

*Preparation of 3β,17β-dihydroxy-17α-(3'-hydroxypropyl)-androst-5-ene*

234 mg. of finely divided lithium are added to the stirred solution of 2.36 g. of gamma-chloropropoxytrimethylsilane in solution in 3 ml. of tetrahydrofuran. After the lithium is added, the reaction mixture is stirred for twenty minutes at room temperature. A solution of 1.18 g. of 3β-hydroxy-androst-5-ene-17-one in 5 ml. of tetrahydrofuran is then added to the reaction mixture with stirring. The reaction mixture is allowed to stand with stirring at room temperature for one hour. 5 ml. of ethanol are then added and the reaction mixture is brought to 0° C. and 10 ml. of 2.5 N hydrochloric acid are added with stirring to the reaction mixture. The reaction mixture is allowed to stand at 0° C. for two hours and then filtered to remove the precipitate of unreacted starting material and 3β,17β-dihydroxy-17α-(3'-hydroxypropyl) - androst - 5 - ene. 3β,17β-dihydroxy-17α-(3'-hydroxypropyl)-androst-5-one is obtained in pure form by chromatographing the precipitate on neutral alumina.

EXAMPLE 4

*Preparation of 3-methoxy-17α-(4'hydroxybutyl)-estra-1,3,5(10)-triene-17β-ol*

140 mg. of finely divided lithium are added to a stirred solution of 4 g. of bis-(delta-chlorobutoxy)-diphenylsilane in solution in 3 ml. of tetrahydrofuran and the reaction mixture is stirred for twenty minutes at room temperature after the lithium is added. A solution of 1.42 g. of 3-methoxy-estra-1,3,5(10)-triene-17-one in 5 ml. of tetrahydrofuran is then added to the reaction mixture with stirring and the reaction mixture is allowed to stand with stirring at room temperature for one hour. 5 ml. of ethanol is added and the reaction mixture is stirred for twenty minutes at room temperature. The temperature of the reaction mixture is brought to 0° C. and 10 ml. of 2.5 N hydrochloric acid are added to the stirred reaction mixture. The reaction mixture is allowed to stand at 25° C. for two hours and then filtered to remove the precipitate of unreacted starting steroid and 3-methoxy - 17α - (4' - hydroxybutyl)-estra-1,3,5(10)-triene-17β - ol. 3 - methoxy - 17α - (4'-hydroxybutyl)-estra-1,3,5(10)-triene-17β-ol is obtained in pure form by chromatographing the precipitate on neutral alumina.

Various changes and modifications may be made in carrying out the present invention without departing from the spirit and scope thereof. Insofar as these changes and modifications are within the purview of the annexed claims, they are considered to be part of the invention.

What is claimed is:

1. A process for preparing a compound selected from the class consisting of 17β-hydroxy-17α-hydroxyalkyl steroids and 17aβ-hydroxy-17aα-hydroxyalkyl-D-homo steroids in which the alkyl group has at least three linearly disposed methylene groups between the hydroxyl group and the carbon atom of the steroid ring to which the hydroxyalkyl group is attached, which comprises the steps of adding a solution in an organic solvent suitable for use in a Grignard reaction of a compound selected from the class consisting of 17-oxo steroids and 17a-oxo-D-homo steroids to a solution in an organic solvent suitable for use in a Grignard reaction of an omega-lithium-alkoxysilyl compound in which the alkyl group has at least three linearly disposed methylene groups between the lithium and oxygen atoms; and adding a hydrolyzing agent.

2. A process for preparing a compound selected from the class consisting of 17β-hydroxy-17α-hydroxyalkyl steroids and 17aβ-hydroxy-17aα-hydroxyalkyl-D-homo steroids in which the alkyl group has at least three linearly disposed methylene groups between the hydroxyl group and the carbon atom of the steroid ring to which the hydroxyalkyl group is attached, which comprises the steps of adding a solution in an organic solvent suitable for use in a Grignard reaction of a compound selected from the class consisting of 17-oxo steroids and 17a-oxo-D-homo steroids to a solution in an organic solvent suitable for use in a Grignard reaction of an omega-lithium-alkoxysilyl compound selected from the class consisting of compounds of the formula:

$$[Li-R_1-O-]_n Si(R_2)_x$$

in which $R_1$ is an alkylene radical having at least three linearly disposed carbon atoms between the lithium and oxygen atoms, $n$ is a number not greater than two, each $R_2$ is a hydrocarbon radical selected from the class consisting of alkyl, aralkyl, aryl and cycloalkyl radicals, $x$ is a number not less than two and not greater than three, $x$ being two when $n$ is two and three when $n$ is one; and adding a hydrolyzing agent.

3. A process for preparing a 17β-hydroxy-17α-hydroxyalkyl steroid in which the alkyl group has at least three linearly disposed methylene groups between the hydroxyl group and the 17-carbon atom, which comprises the steps of adding a solution in an organic solvent suitable for use in a Grignard reaction of a 17-oxo-steroid to a solution in an organic solvent suitable for use in a Grignard reaction of an omega-lithium-alkoxysilyl compound selected from the class consisting of compounds of the formula:

$$[Li-R_1-O-]_n Si(R_2)_x$$

in which $R_1$ is an alkylene radical having at least three linearly disposed carbon atoms between the lithium and oxygen atoms, $n$ is a number not greater than two, each $R_2$ is a hydrocarbon radical selected from the class consisting of alkyl, aralkyl, aryl and cycloalkyl radicals, $x$ is a number not less than two and not greater than three, $x$ being two when $n$ is two and three when $n$ is one; and adding a hydrolyzing agent.

4. A process for preparing a 17aβ-hydroxy-17aα-hydroxyalkyl-D-homo steroid in which the alkyl group has at least three linearly disposed methylene groups between the hydroxyl group and the 17a-carbon atom, which comprises the steps of adding a solution in an organic solvent suitable for use in a Grignard reaction of a 17a-oxo-D-homo-steroid to a solution in an organic solvent suitable for use in a Grignard reaction of an omega-lithium-alkoxysilyl compound selected from the class consisting of compounds of the formula:

$$[Li-R_1-O-]_n Si(R_2)_x$$

in which $R_1$ is an alkylene radical having at least three linearly disposed carbon atoms, $n$ is a number not greater than two, each $R_2$ is a hydrocarbon radical selected from the class consisting of alkyl, aralkyl, aryl and cycloalkyl radicals, $x$ is a number not less than two and not greater than three, $x$ being two when $n$ is two and three when $n$ is one; and adding a hydrolyzing agent.

5. A process for preparing a compound selected from the class consisting of 17β-hydroxy-17α-(3'-hydroxypropyl) steroids and 17aβ-hydroxy-17aα-(3'-hydroxypropyl)-D-homo steroids, which comprises the steps of adding a solution in an organic solvent suitable for use in a Grignard reaction of a compound selected from the class consisting of 17-oxo steroids and 17a-oxo-D-homo steroids to a solution in an organic solvent suitable for use in a Grignard reaction of gamma-lithium-propoxytrimethylsilane, and adding a hydrolyzing agent.

6. A process for preparing a compound selected from the class consisting of 17β-hydroxy-17α-(3'-hydroxypropyl) steroids and 17aβ-hydroxy-17aα-(3'-hydroxypropyl)-D-homo steroids, which comprises the steps of adding a solution in an organic solvent suitable for use in a Grignard reaction of a compound selected from the class consisting of 17-oxo steroids and 17a-oxo-D-homo steroids to a solution in an organic solvent suitable for use in a Grignard reaction of gamma-lithium-propoxytriphenylsilane, and adding a hydrolyzing agent.

7. A process for preparing a compound selected from the class consisting of 17β-hydroxy-17α-(4'-hydroxybutyl) steroids and 17aβ-hydroxy-17aα-(4'-hydroxybutyl)-D-homo steroids, which comprises the steps of adding a solution in an organic solvent suitable for use in a Grignard reaction of a compound selected from the class consisting of 17-oxo steroids and 17a-oxo-D-homo steroids to a solution in an organic solvent suitable for use in a Grignard reaction of delta-lithium-butoxytrimethylsilane, and adding a hydrolyzing agent.

8. A process for preparing a 17β-hydroxy-17α-(3'-hydroxypropyl) steroid which comprises the steps of adding a solution in an organic solvent suitable for use in a Grignard reaction of a 17-oxo-steroid to a solution in an organic solvent suitable for use in a Grignard reaction of gamma-lithium-propoxytrimethylsilane, and adding a hydrolyzing agent.

9. A process for preparing 17aβ-hydroxy-17aα-hydroxyalkyl-(3'-hydroxypropyl)-D-homo steroid which comprises the steps of adding a solution in an organic solvent suitable for use in a Grignard reaction of a 17a-oxo-D-homo steroid to a solution in an organic solvent suitable for use in a Grignard reaction of gamma-lithium-propoxytrimethylsilane, and adding a hydrolyzing agent.

10. A process for preparing the compound 3-methoxy - 17α - (3' - hydroxypropyl - estra - 1,3,5(10) - triene-17β-ol which comprises the steps of adding a solution in an organic solvent suitable for use in a Grignard reaction of 3-methoxy-estra-1,3,5(10)-triene-17-one to a solution in an organic solvent suitable for use in a Grignard reaction of gamma-lithium-propoxytrimethylsilane, and adding a hydrolyzing agent.

11. A process for preparing the compound 3-methoxy-17aα(3' - hydroxypropyl) - 17aβ - hydroxy - 1,3,5(10)-D-homoestratriene which comprises the steps of adding a solution in an organic solvent suitable for use in a Grignard reaction of 3-methoxy-1,3,5(10)-D-homoestratriene-17-one to a solution in an organic solvent suitable for use in a Grignard reaction of gamma-lithium-propoxytrimethylsilane, and adding a hydrolyzing agent.

12. A process for preparing the compound 3β,17β-dihydroxy-17α-(3'-hydroxypropyl)-androst-5-ene which comprises the steps of adding a solution in an organic solvent suitable for use in a Grignard reaction of 3β-hydroxy-androst-5-ene-17-one to a solution in an organic solvent suitable for use in a Grignard reaction of gamma-lithium-propoxytrimethylsilane, and adding a hydrolyzing agent.

13. A process for preparing the compound 3-methoxy-17α - (4' - hydroxybutyl) - estra - 1,3,5(10) - triene - 17β-ol which comprises the steps of adding a solution in an organic solvent suitable for use in a Grignard reaction of 3-methoxy-estra-1,3,5(10)-triene-17-one to a solution in an organic solvent suitable for use in a Grignard reaction of bis-(delta-lithium-butoxy)-diphenylsilane; and adding a hydrolyzing agent.

No references cited.

LEWIS GOTTS, *Primary Examiner.*

H. FRENCH, *Assistant Examiner.*